3,652,617
VANADIUM OXYTRIALCOHOLATES
Erich Termin, Niederkassel, Otto Bleh, Bergheim, and Arnold Lenz, Cologne-Stammheim, Germany, assignors to Dynamit-Nobel Aktiengesellschaft, Troisdorf, Germany
Filed Dec. 9, 1969, Ser. No. 883,527
Claims priority, application Germany, Dec. 21, 1968,
P 18 16 386.5
Int. Cl. C07f 9/00
U.S. Cl. 260—429 R    6 Claims

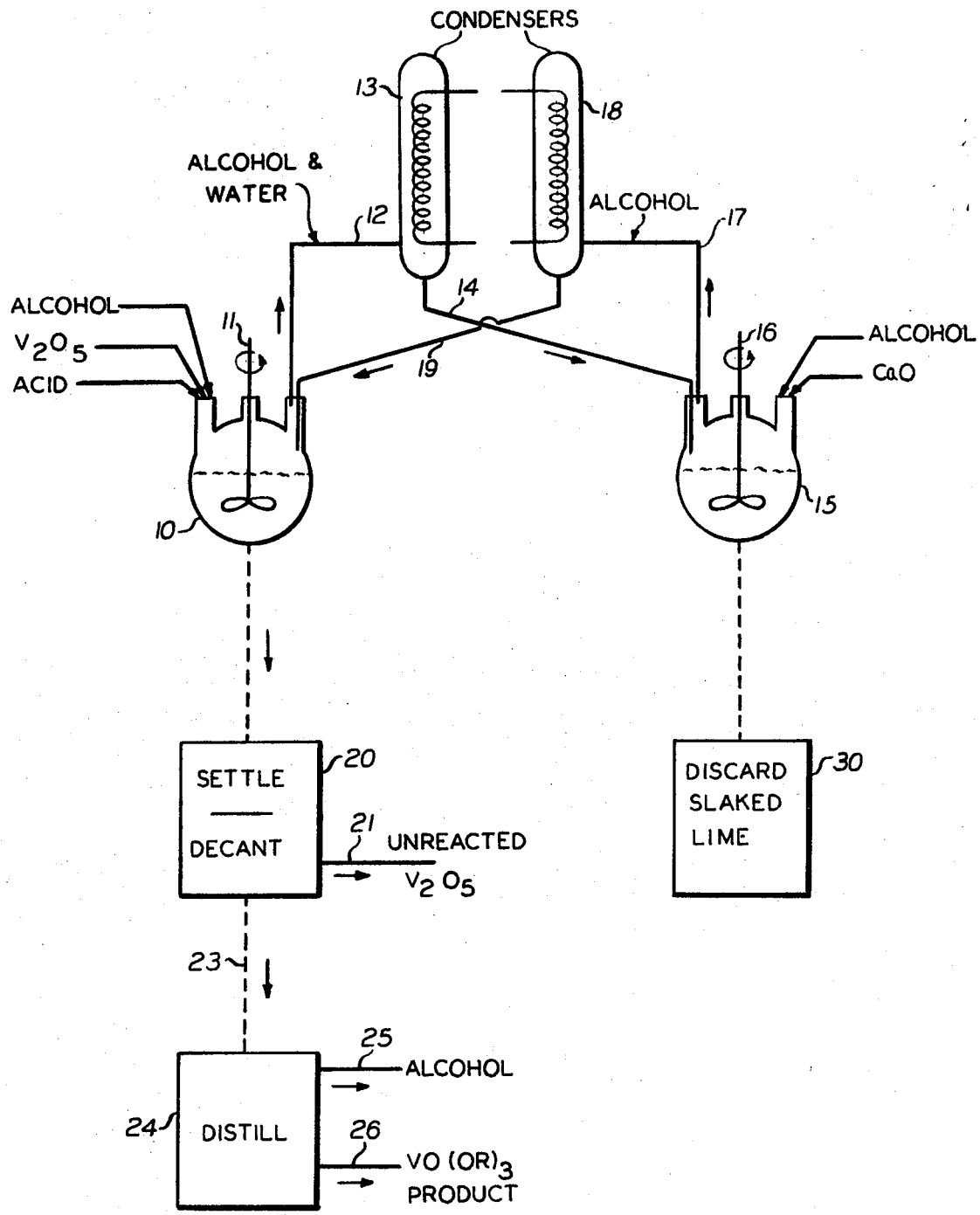

ABSTRACT OF THE DISCLOSURE

Preparation of alcoholates of orthovanadic acid, called vanadium oxy esters or vanadyl esters, having the general formula:

$$VO(OR)_3$$

in which R represents alkyl or cycloalkyl radicals, especially those having 1 to 5 carbon atoms in the alkyl radical, by the reaction of vanadium pentoxide with anhydrous alcohols.

---

Vanadium oxytrialcoholates are mainly liquid products which easily hydrolyze in the presence of even small amounts of water, as for example in the presence of atmospheric moisture. They are used for many different chemical reactions and especially as polymerization catalysts. Their use as catalysts can be direct, as in the copolymerization of ethylene and propylene, although the esters can also be applied to suitable catalyst supports and hydrolyzed, and used in this form.

A number of methods for the preparation of vanadium oxytrialcoholates are known. For example, vanadium oxytrichloride can be reacted with sodium methoxide to produce a reaction mixture containing vanadium oxytrialcoholate and sodium chloride. A method is disclosed in Izv. Akad. Nauk. SSSR. Otdel. Khim. Nauk 1958, pp. 503–504, for reacting vanadium oxytrichloride and alcohols and then neutralizing the reaction mixture with ammonia to obtain a product containing vanadium oxytrialcoholate and ammonium chloride.

It is also known to react vanadium pentoxide with alcohols at boiling temperature to obtain a reaction mixture containing vanadium oxytrialcoholate, alcohol and unreacted vanadium pentoxide (J. anor. allg. Chem., vol. 82, 1913, pp. 103 to 129).

The first two methods based on the use of the oxytrichloride have considerable disadvantages in that they are relatively expensive. In order to perform the process the reactants must be brought together under refrigeration, and to complete the reaction and achieve the best crystal formation in the crystalline by-product, heat must be applied afterward. Then the solid products have to be separated by centrifugation or filtering and the solvents have to be recovered, for example by the fractional distillation of the solutions freed of the solids. These processes suffer from poor yields, usually about 60 percent, at most, of the desired ester, with reference to the vanadium oxytrichloride that is charged. Also, large quantities of worthless by-products are produced. Furthermore, the desired esters cannot be prepared free of chlorides, which has an unfavorable effect on their stability in storage, so that the esters discloro in time and yield aldehydes.

The reaction of vanadium pentoxide with alcohols does result in esters of high quality, but the yields are entirely inadequate so that the process is virtually impracticable from a commercial standpoint. The yields generally amount to no more than 30 percent, based on the vanadium pentoxide, especially when the lower aliphatic alcohols are used, and this only when the amount of vanadium pentoxide starting material is very small in proportion to the alcohol used.

French Pat. 1,271,641 discloses a process whereby vanadyl esters are prepared by the reaction of vanadium pentoxide with alcohols having 5 or more carbon atoms in the presence of catalysts and dehydrating agents. Phenols and phenol derivatives, as well as weak acids such as boric acid, are named as catalysts. These catalysts, however, are at best poorly effective, and are ineffective in the reaction of alcohols having up to four carbon atoms. The result is that most of the vanadium pentoxide starting material is not reacted at all, and the process suffers the considerable disadvantage that after the reaction of the finely ground vanadium pentoxide with the lower aliphatic alcohols the reaction product is a colloidal suspension of the unreacted vanadium pentoxide in the ester alcohol mixture. This suspension can be separated only with great difficulty, usually with recourse to filter aids such as silica gel or active charcoal, and the separation entails the loss of vanadium pentoxide. It is true that these kinds of suspensions generally form when finely divided vanadium pentoxide is reacted with a lower aliphatic alcohol, but nevertheless the catalysts named in the French patent contribute very heavily to the formation of the suspension. Consideration should also be given to the fact that, if vanadium pentoxide gets into the crude ester solution that is to be separated, water forms during the distillation. This water promotes the formation of vanadium polyesters of the type:

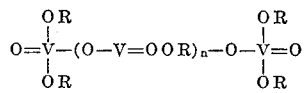

thereby reducing the yield of the pure ester.

It has surprisingly been found that vanadium oxytrialcoholates of the general formula:

$$VO(OR)_3$$

wherein R represents an alkyl or cycloalkyl radical, especially one having 1 to 5 carbon atoms, can be obtained in very good yields by the reaction of vanadium pentoxide with the corresponding anhydrous alcohol at an elevated temperature in a process which is characterized by the fact that a strongly acid catalyst is used, and the water that is formed in the reaction is separated from the reaction mixture as it forms.

The reaction is preferably carried out at the boiling temperature of the reaction mixture. Specially useful catalysts are strongly acid organic or inorganic compounds having a dissociation constant of up to $10^{-3}$. Mineral acids, preferably sulfuric acid or even hydrochloric acid, are suitable, as are such organic acids as benzenesulfonic acid, p-toluenesulfonic acid, oxalic acid, maleic acid and malonic acid.

The process is preferably performed by heating the reactants at ebullition for 30 minutes to 8 hours, with stirring, the reaction mixture consisting of the vanadium pentoxide, the alcohol and the catalyst. The weight ratio of vanadium pentoxide to alcohol can be in the range of from 1:20 to 1:2; a ratio of 1:12 being preferred, as regards the ester yield and economy in the performance of the process.

The catalyst is used preferably in quantities amounting to from 1 to 10 percent of the weight of the vanadium pentoxide.

The water formed by the reaction is continuously distilled, preferably together with excess alcohol, into a second reaction vessel in which a substance is contained which absorbs water, preferably quicklime. It is particularly advantageous to form a suspension of the lime in the alcohol used in the reaction and to use this to absorb the water. The alcohol-water mixture distilled off overhead is dehydrated by the lime-alcohol mixture in a second reaction vessel with intense stirring and the alcohol is distilled back into the first reaction vessel in which the reaction with the vanadium pentoxide is taking place.

This method of alcohol dehydration is very effective, and is clearly superior to the method which might be practiced, for example, in a Soxhlet apparatus. It should be noted that when quicklime is used as the water-absorbing agent if the mass is not agitated a slimy layer of calcium hydroxide forms on the surface which prevents the further penetration of water to the interior of the reaction mixture.

The use of secondary or tertiary alcohols is preferred. In the case of alcohols having four or more carbon atoms in the molcule, whose miscibility with water is limited, and which form extremely desirable azeotropic mixtures with water, the use of dehydrating substances can be entirely eliminated if desired. With n-butanol, for example, a butanol-water azeotrope forms having up to 42 percent water, but about 8 percent of water permanently mixes with butanol. Since water has a greater density than butanol, it immediately settles in the distillate and can be easily separated. It is possible in this case to combine the two methods of density difference separation and water absorption.

Another advantage of the present process is the fact that any vanadium pentoxide that may not have completely reacted settles out with great speed, which was not the case in the processes known hitherto, including the process described in the French patent cited above. The alcoholic ester solution that is above the sediment becomes so clear that it does not have to be filtered and can be decanted. In this manner, losses such as are practically unavoidable in filtering are almost entirely prevented.

The alcohol from the clear solution obtained by decanting can be distilled in vacuo and the remaining crude ester can be further purified by distillation. Since no by-products are formed, fractionation is not necessary in the process according to the invention because the boiling points of the alcohols used and those of the esters formed in the reaction are quite different.

The yields of pure esters achieved in the process of the invention depend on the ratio of the vanadium pentoxide starting material to the alcohol, on the boiling temperature of the alcohol, and on the grain size of the vanadium pentoxide. The yields are usually between 40 and 80 percent, based on the original amount of vanadium pentoxide starting material. Since the unreacted vanadium pentoxide can be re-introduced into the starting mixture, practically no losses occur, and the yields are practically perfect with reference to vanadium pentoxide.

The esters made according to the present invention are analytically pure and can be used directly, as catalysts for example, and especially as polymerization catalysts. Their shelf life is practically unlimited if atmospheric oxygen is excluded, and even after long storage periods the esters do not discolor or decompose.

The drawing:

The drawing is a schematic illustration of the process described in Example I.

EXAMPLE I

In a 6-liter three-necked flask 10, equipped with stirrer 11 and connected by line 12 to a reflux condenser 13, 200 g. of finely ground vanadium pentoxide are suspended in 2 liters of isopropanol. Then 10 ml. of concentrated sulfuric acid are added as catalyst. The reflux condenser 13 is connected by line 14 to a second 6-liter three-necked flask 15 containing a suspension of 500 g. of CaO in 3 liters of isopropanol. This second three-necked flask is also equipped with a stirrer 16 and is connected by line 17 to reflux condenser 18. The condensed anhydrous alcohol flows by line 19 from the second reflux condenser 18 back into the first reaction flask 10 in which the reaction of the vanadium pentoxide with the alcohol is taking place. The two reaction mixtures are heated to ebullition and reflux-distilled with crossover for about ½ to 4 hours, until the water content in the alcohol from the vanadium pentoxide-alcohol reaction has been greatly diminished and amounts to about 0.30 percent. Then the unreacted vanadium pentoxide is allowed to settle in step 20 for 1 to 3 hours and is removed at 21, the ester alcohol mixture is decanted by line 23. The isopropanol is distilled therefrom at 24 at 65° C. under a pressure of 17 torr and removed at 25, and the pure vanadium oxytriisopropanol is distilled at a pressure of 3 torr at 76° C. and removed at 26. The slaked lime is discarded at 30.

The pure ester yield amounts to 418 g.; this corresponds to a yield of 78 percent with reference to the vanadium pentoxide starting material.

The isopropyl ester obtained is a water-clear liquid having an index of refraction $n_D{}^{25}=1.4790$.

*Analysis.*—Found (percent): V, 20.9; C, 44.22; H, 8.66. Calculated (percent): V, 20.9; C, 44.24; H, 8.616.

EXAMPLE II

Under the conditions described in Example I, 430 g. of vanadyl-n-propylate was obtained from 200 g. of vanadium pentoxide and 2 liters of n-propanol after a reaction period of 120 minutes, using 10 ml. of concentrated sulfuric acid as the catalyst. This corresponds to a yield of 80 percent, with reference to the vanadium pentoxide starting material.

EXAMPLE III

Under the same conditions described in Example I, 390 g. of vanadyl isobutylate were obtained from 200 g. of vanadium pentoxide and 2 liters of isobutanol after 90 minutes of reaction time, using 10 ml. of concentrated sulfuric acid as the catalyst. This corresponds to a yield of 62 percent with reference to the initial vanadium pentoxide charge.

EXAMPLE IV

Under the same conditions as in Example I, 295 g. of vanadyl isopropylate were obtained from 200 g. of vanadium pentoxide and 3 liters of isopropanol after 90 minutes of reaction time, using 10 ml. of concentrated hydrochloric acid as the catalyst. This corresponds to a yield of 55 percent.

EXAMPLE V

If the same procedure is followed as in Example IV, but replacing the concentrated hydrochloric acid with 5 g. of benzenesulfonic acid as the catalyst, 380 g. of the pure vanadyl isopropylate is obtained, which corresponds to a yield of 72 percent.

EXAMPLE VI

If the reaction is performed under the conditions stated in Example I, but 5 g. of p-toluenesulfonic acid is used instead of sulfuric acid, and n-butanol is used instead of isopropanol, 374 g. of pure vanadyl-n-butylate is obtained, which corresponds to a yield of 60 percent.

COMPARATIVE EXAMPLE

To illustrate the advantages of the present process over the process known from the French patent, comparative tests were performed using the cresol that is named as a catalyst in that patent. First 200 g. of vanadium pentoxide and 2 l. of isopropanol were reacted with the quantity of catalyst specified in the French patent, namely 1 g. of cresol, the procedure being the same as in the above Example IV. 161 g. of vanadyl isopropylate were obtained, which corresponds to a yield of 29 percent with reference to the vanadium pentoxide charge.

To determine whether larger amounts of catalyst might provide better yields, the experiment was repeated, using 5 g. of cresol in one case and 20 g. of cresol in a second case. 464 g. of pure vanadyl isopropylate was obtained in the first case, corresponding to a yield of about 30 percent, while in the second case only 139 g. of the pure vanadyl isopropylate were obtained, i.e., the yield in this case amounted to only 26 percent.

We claim:

1. A process for the preparation of vanadium oxytrialcoholate of the general formula VO(OR)$_3$, wherein R is an alkyl or cycloalkyl radical, comprising reacting vanadium pentoxide with an anhydrous alcohol containing said R radical at an elevated temperature in the presence of a strongly acidic catalyst selected from the group consisting of inorganic and organic acids having a dissociation constant of up to about 10$^{-3}$ and separating from the reaction mixture the water formed by the reaction as it is formed.

2. The process of claim 1 wherein said reaction mixture is well agitated and is maintained at its boiling point and said water is removed overhead by distillation.

3. The process of claim 1, wherein said catalyst is used in a quantity of 1 to 10 weight percent with reference to said vanadium pentoxide present in the reaction mixture.

4. The process of claim 1, wherein said catalyst is sulfuric acid.

5. The process of claim 1, wherein said catalyst is an organic sulfonic acid.

6. The process of claim 2 wherein alcohol is removed overhead together with said water and the alcohol-water mixture is dehydrated at its boiling temperature with intense stirring with the alcohol component thereof being distilled overhead therefrom and returned to said reaction mixture.

References Cited

UNITED STATES PATENTS 2,220,041   10/1940   Hill _____ 260—429

FOREIGN PATENTS 1,271,641   7/1961   France _____ 260—429

OTHER REFERENCES

Finar: Organic Chemistry, Longmans, Green and Co., Ltd., London, 1963 (4th edition), p. 187.

TOBIAS E. LEVOW, Primary Examiner

A. P. DEMERS, Assistant Examiner

U.S. Cl. X.R.

252—431 R